US005130721A

United States Patent [19]

Sukhman

[11] Patent Number: 5,130,721

[45] Date of Patent: Jul. 14, 1992

[54] LASER WIRE MARKING METHOD AND APPARATUS

[75] Inventor: Yefim P. Sukhman, Phoenix, Ariz.

[73] Assignee: General Laser, Inc., Scottsdale, Ariz.

[21] Appl. No.: 294,347

[22] Filed: Jan. 9, 1989

[51] Int. Cl.$^5$ ..................... G01D 9/00

[52] U.S. Cl. ..................... 346/1.1; 346/76 L; 219/121.68

[58] Field of Search ..................... 246/1.1, 76 L; 219/121.68

[56] References Cited

U.S. PATENT DOCUMENTS

| | | | |
|---|---|---|---|
| 3,378,446 | 4/1968 | Whittlesey | 176/1 |
| 3,943,324 | 3/1976 | Haggerty | 219/121 |
| 3,953,706 | 4/1976 | Harris et al. | 219/121 |
| 4,012,213 | 3/1977 | Haggerty et al. | 65/13 |
| 4,063,528 | 12/1977 | Kimmich | 118/7 |
| 4,121,595 | 10/1978 | Heitmann et al. | 131/21 |
| 4,524,784 | 6/1985 | Seragnoli et al. | 131/281 |
| 4,524,785 | 6/1985 | Seragnoli et al. | 131/281 |
| 4,534,313 | 8/1985 | Louvel | 346/76 L |
| 4,626,652 | 12/1986 | Bjork et al. | 219/121 |
| 4,638,558 | 1/1987 | Eaton | 29/861 |
| 4,652,722 | 3/1987 | Stone et al. | 346/76 L |
| 4,671,848 | 6/1987 | Miller et al. | 156/643 |
| 4,808,966 | 2/1989 | Ferlier et al. | 219/121.68 |

FOREIGN PATENT DOCUMENTS

| | | | |
|---|---|---|---|
| 52-36032 | 3/1977 | Japan . | |
| 61-201731 | 9/1986 | Japan . | |
| 0015446 | 1/1988 | Japan | 346/76 L |

*Primary Examiner*—Benjamin R. Fuller
*Assistant Examiner*—Huan Tran
*Attorney, Agent, or Firm*—David G. Rosenbaum

[57] ABSTRACT

A method and apparatus for marking coated wire with alphanumeric characters is disclosed. An electrically conductive wire is surrounded with a coating; a plurality of lasers are circumferentially disposed around the wire, each laser generates a beam of coherent energy of sufficient intensity to focus on and ablate a dot-shaped area of the coating thereby creating a corresponding dot of the contrasting color. As the wire is moved past the lasers, the laser beams are sequentially triggered in synchronization with the motion of the wire to produce a matrix of dots representing alphanumeric characters appropriate for identification of the wire.

15 Claims, 3 Drawing Sheets

LASER WIRE MARKING METHOD AND APPARATUS

FIELD OF THE INVENTION

The present invention relates to a laser method and apparatus for marking wire with alphanumeric characters.

DESCRIPTION OF THE PRIOR ART

Electrical signals in modern aircraft or communications systems are generally carried by wire harnesses comprising bundles of insulated wires routed between different electrical terminals. Such harnesses are commonly assembled prior to installation.

Manufacturers using wire harnesses usually require the wires in the wire harnesses to be identified such as by labeling or marking at predetermined distances along the length of the wire. For example, in the aircraft industry it is typical to require labeling or marking of wires at intervals of approximately three inches to facilitate testing, circuit tracing, or repairs in the event a fault is detected. In the past, a variety of techniques have been used to identify individual wires; for example, color coding as described in U.S. Pat. No. 4,063,528 (Kimmich) or stamping or printing information on the wire insulation is frequently used.

Wire identification by color is extremely difficult in view of the large number of wires usually included in a single wire harness and the limited number of distinguishable colors and color combinations available. Stamping or printing are extremely difficult techniques to employ on small gauge wires when overall wire and insulation thickness may vary; further, the resulting markings must remain clearly legible after substantial handling.

SUMMARY OF THE INVENTION

The present invention incorporates a laser method and apparatus for marking wires with alphanumeric characters. In the embodiment chosen for illustration, at least one electrically conductive wire is surrounded with electrical insulation; a first coating is disposed on the insulation and a top or second coating is placed over the first coating. The top coating has a color contrasting to that of the first coating. A plurality of lasers are circumferentially disposed around the wire; each laser is capable of generating a beam of coherent energy having sufficient intensity to focus on and ablate a dot-shaped area of the top coating, thereby exposing a corresponding dot of the contrasting color of the first coating which underlies the top coating. Means are provided for moving the wire past the circumferentially disposed lasers. Means are further provided to sequentially trigger the laser beams, in sychronization with the moving wire, to produce on the wire at specified intervals a matrix of dots representing alphanumeric characters appropriate for identification of the wire.

It is a primary object of the present invention to provide an accurate and efficient method and apparatus to mark individual wires to thereby permit identification of the wires when combined with other wires in a wiring harness.

It is a further object of the present invention to provide a method and apparatus to mark insulated wires which can be adapted to mark many different sizes of wires.

It is another object of the present invention to provide a method and apparatus to mark individual wires in a manner to insure that the markings become permanent and cannot be erased or obliterated through normal handling.

Other objects, advantages and features of the present invention will become apparent from the following specification when taken in conjunction with the accompanying drawings.

DESCRIPTION OF THE PREFERRED EMBODIMENT

Figure 1:
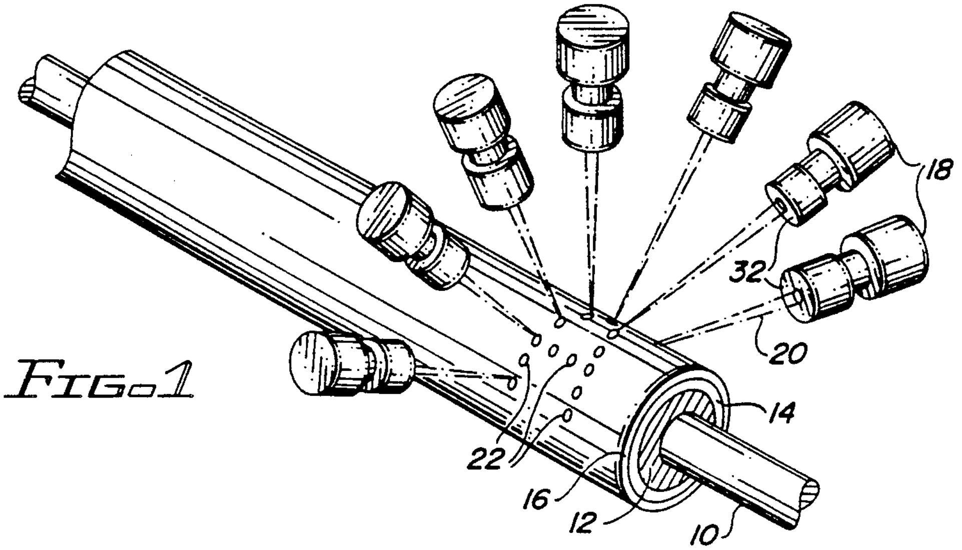
FIG. 1 is a schematic representation of wire marking apparatus constructed in accordance with the teachings of the present invention.
Figure 2:
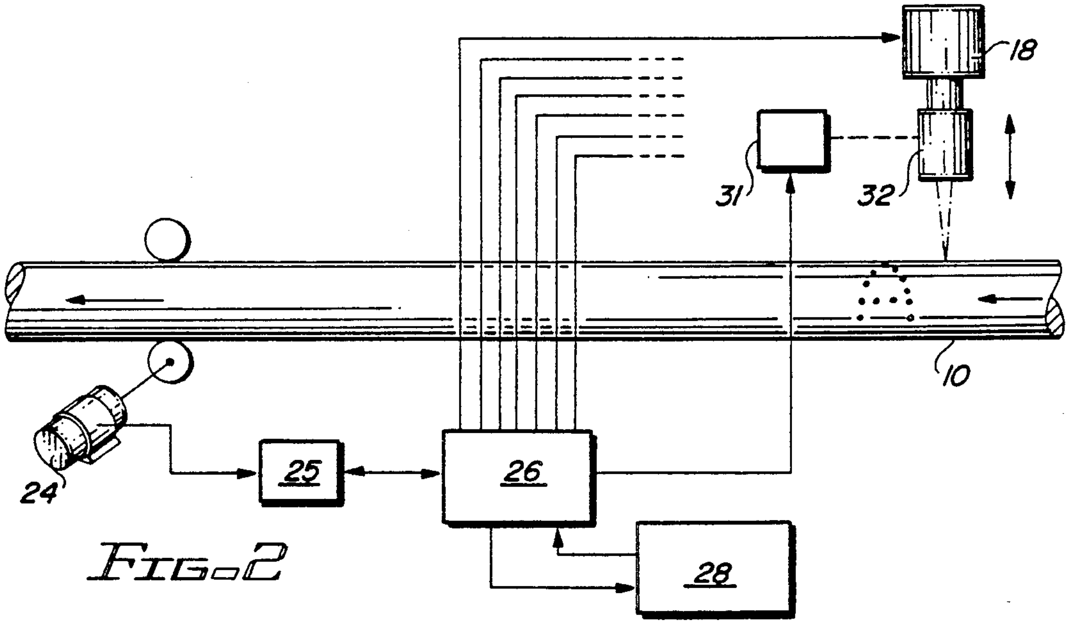
FIG. 2 is a schematic block diagram illustrating a synchronization and timing technique for use in the laser wire marking apparatus of the present invention.

Referring to FIGS. 1 and 2, the wire 10 is encased in or surrounded with electrical insulation 12, a first coating 14 is placed on the insulation 12, and a top coating 16 is positioned on the first coating. Both first coating 14 and top coating 16 can be made from a variety of coating materials. While the embodiment chosen for illustration incorporates two coatings about the electrical insulation, other arrangements of electrical conductor/insulation/coatings may be used. For example, if the electrical insulation is sufficiently thick so as to avoid any prohibitive weakening in its insulation value, a simple PVC (polyvinylchloride) insulation may be used. In the latter instance, the laser may be simply focused on the insulation causing the dots to be formed by darkening the PVC (essentially carbonizing the PVC at the point of laser focus). The dots thus formed may be utilized as a means to imprint a dot matrix alphanumeric symbol.

A plurality of lasers 18 are circumferentially disposed around wire 10. Many different types of lasers may be used; however, in the embodiment chosen for illustration, lasers 18 are $Co_2$ gas lasers operating at a wavelength of 10.6 microns. Each laser, when energized, generates a laser beam 20 shaped by means of beam shaping optical systems 32. The beam shaping optical system 32 may be, for example, a lens system or other well known optical system for focusing or defocusing the laser beam. Such optical systems may therefore be utilized to vary the laser beam cross-sectional energy distribution to accommodate the particular parameters required of a particular application. Each laser beam may be focused at the surface of the top coating 16; however, in some instances it is desirable not to concentrate the energy of the beam but rather "defocus" the beam to limit the energy penetration at the surface of the wire to avoid any possibility of insulation damage. Thus, an optical system 32 is used in each instance that may be used to appropriately shape the beam at its point of impingement on the surface of the insulation or coating to correspond to the variations in the compositions used for the coatings and the insulation on the wire. The laser beams have coherent energy of sufficient intensity to be shaped or focused on and ablate a dot-shaped area of the top coating 16, thereby exposing a corresponding dot 22 of the contrasting color of the first coating 14 underlying the top coating 16. Preferably, top coating 16 is white and first coating 14 is black. The black first coating 14 functions as a heat sink to absorb and dissipate excess heat from the laser beams 20 (which is above the level of heat required for ablation of dot-shaped areas of top coating 16).

In FIG. 1, seven lasers 18 are circumferentially arranged around wire 10 in an approximate 120° arc; however, the arc may be extended, up to a complete 360°, and additional lasers may be added. The number of lasers and their specific disposition in an arcuate array about the wire will depend on several factors including the number of "dots" desired in the chosen dot matrix. In the embodiment chosen for illustration, seven lasers have been used to provide a total of seven dots in any one column of the matrix; the choice of this particular matrix comports with dot matrix systems of the size appropriate to enable visual recognition of the alphanumeric character while occupying the least space necessary on the wire.

Referring to the simplified block diagram of FIG. 2, a drive means 24 is provided to move the wire 10 past the radially disposed lasers 18. The speed with which the wire is fed past the radially disposed lasers is monitored and encoded by encoder 25, and will depend on a variety of factors; however, in the embodiment chosen for illustration the speed has been chosen to be within the range of about 1 to 200 feet per minute, with the preferred speed closer to 200 feet per minute. The encoder 25 provides feedback to process controller 26 which in turn communicates with computer 28. The feedback from the drive means 24 through the process controller 25 provides speed and position information relating to the wire 10 and is used by the computer 28 to cause sequential triggering, synchronized with the motion of the wire 10, of the respective lasers. This triggering of the lasers 18 produces a matrix of dots 22, representing alphanumeric characters appropriate for identification of the wire, at specified intervals.

The laser beam may be shaped through the use of beam shaping optical systems such as that shown at 32 and discussed above. The positioning of the optical systems 32 and the focusing or defocusing of the respective laser beams is accomplished through programming of the process controller 26 operating on an optical system drive 31. While in the diagram of FIG. 2, a single laser and corresponding optical system is shown, it will be obvious to those skilled in the art that each of the circumferentially disposed lasers will be connected to the process controller 26 to be triggered in accordance with the alphanumeric character being disposed on the wire 10. The drive means 24, as well as the encoder 25, process controller 26, computer 28, and optical system drive 31 are conventional well known apparatus and circuits the selection of which is well within those of ordinary skill in the art. Using well known components and presently available programming techniques, it is readily apparent to those skilled in the art that the program may not only be used to appropriately trigger the proper lasers to insure encoding of the dot matrix on the wire, but that the pulse width of the individual lasers may be adjusted to accommodate variations between respective laser devices to insure uniform energy impingement on the surface of the wire being encoded.

Figure 3:
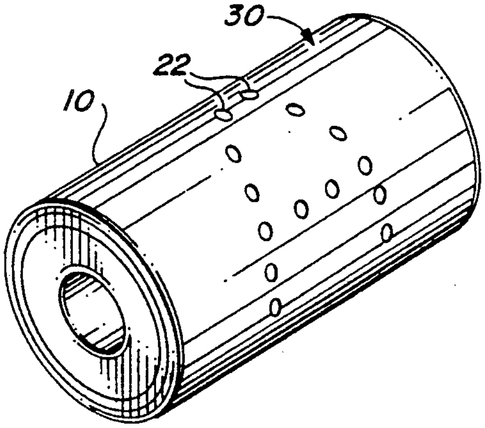
FIG. 3 is an enlarges view of a wire marked with a dot matrix by the laser apparatus of the present invention.

FIG. 3 illustrates a dot matrix 30 representing the letter "A" which was produced on a wire 10 by the method and apparatus of the present invention. The dots 22 actually are portions of the first coating 14 (which underlie the top coating 16) that are exposed through the ablations in the top coating. The portions of the first coating 14 are visible because the color contrasts with the color of the top coating 16. Again, the choice of the particular type of laser, as well as the shaping of the laser beam, will depend on the composition of the surface material upon which the marking is to take place and the speed with which such marking is to occur. A clearly visible dot should be provided within the dot matrix of the alphanumeric character while insuring that no deterioration of the wire insulation occurs, or that any deterioration is within acceptable limits.

Figure 4:
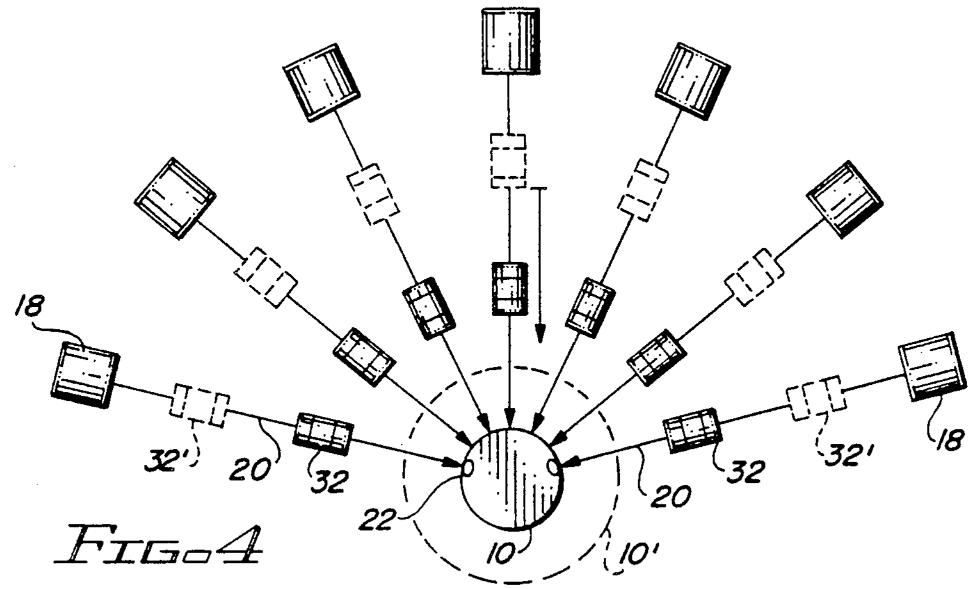
FIG. 4 is a schematic representation showing alternate positions of focusing lenses used to mark wires of different diameters.

The method and apparatus of the present invention may be adjusted to accommodate wires of different diameters. The usual wire sizes are in the range of 12 to 24 gauge although other sizes or ranges could be accommodated. The optical system drive 31 of FIG. 2 is used to appropriately position the respective optical systems 32 to focus the corresponding laser beams on the surface of the wire be encoded. The specific drive mechanism is not particularly important except that reasonable manufacturing efficiencies demand that the individual optical systems be moved to the appropriate focusing or defocusing positions simultaneously. Referring now to FIG. 4, it may be seen that each of the optical systems 32 is positioned radially with respect to the wire to accommodate different overall wire and coating diameters and to insure proper focusing or defocusing of the laser beam at the surface. The lasers 18 remain stationary when optical systems 32 are moved to their proper radial position. Thus, each of the optical systems 32 move along their respective axis in a direction radial to the axis of the wire to move the corresponding point of focus of the respective coherent light beam along lens axis. This point of focus is adjusted to coincide with the surface of the wire coating that is to be ablated. Obviously, each of the optical systems must be adjusted along its respective axis so that the point of focus of each of the laser beams coincides with the circumferential surface of the wire. For convenience, the optical systems may be mechanically interconnected to provide a means for simultaneously adjusting all of the focusing points; this latter feature may be employed to reduce the time necessary for adjustment of the appartus of the present invention in the event of a change in the diameter of the wire being processed. Further, the diameter of the overall coated and insulated wire may change even through the diameter of the wire itself may remain the same. For example, wire insulation applied by different manufactures may result in the gross diameter of the insulated wire that is larger or smaller than similar gauge wire from other manufacturers. Accordingly, the adjustments of the individual optical systems on the respective laser beams permit adjustments not only to accommodate different wire sizes but to accommodate variations in the gross diameter of similar wire gauges obtained from different manufactures.

By reference to FIG. 4, it may be seen that the wire 10 is exposed to focused laser beams 20 emanating from lasers 18 and directed through optical systems 32. Superimposed on wire 10 and shown by dashed lines is wire 10', having a larger diameter than wire 10. The optical systems 32 have correspondingly been moved radially outwardly to new positions 32', to take into account the increased diameter of wire 10' and to refocus the respective beams on the new surface of the increased diameter wire.

Figure 5:
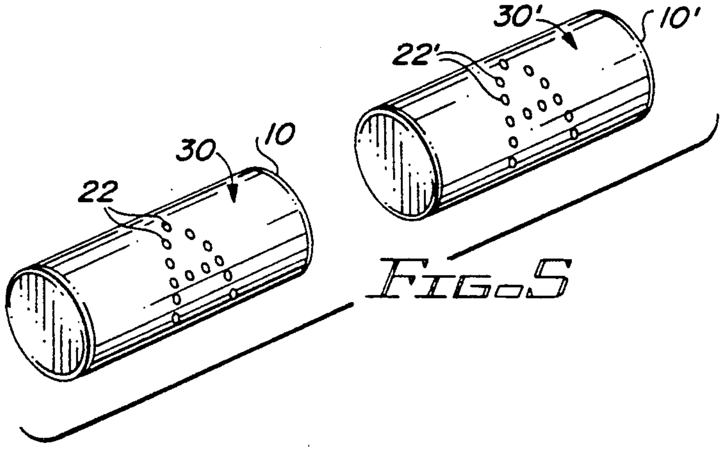
FIG. 5 is a view of wires of different diameters marked with different sized dot matrices by the apparatus of the present invention useful in describing the accommodation of different size wires in the apparatus of the present invention.

FIG. 5 illustrates the relative size of the dot matrices 30 and 30' produced on the wires 10 and 10' by the lasers 18 and focusing lenses 32 and 32', respectively. As can be seen, the dots 22' which make up dot matrix 30' are larger and spaced farther apart than the dots 22 which make up dot matrix 30. Thus, the apparatus and method of the present invention provide a means for marking individual wires with a suitable dot matrix alphanumeric characters while accommodating the relative diameters of various wire sizes (including variation in thicknesses of the insulation and/or coatings on the wire). Further, as the overall diameter of the wire decreases, the size of the alphanumeric characters automatically proportionately decrease to thereby provide accurate and appropriate marking commensurate with wire size.

Figure 6:
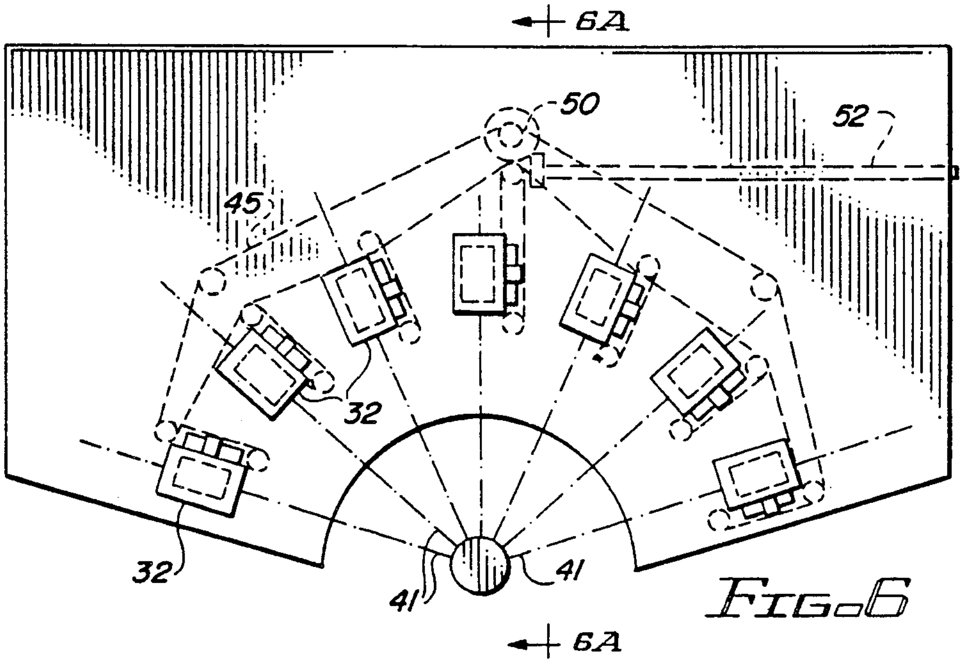
FIG. 6 is a front elevational view of apparatus for simultaneously adjusting the focus on all laser beams to accommodate varying wire diameters.
Figure 6A:
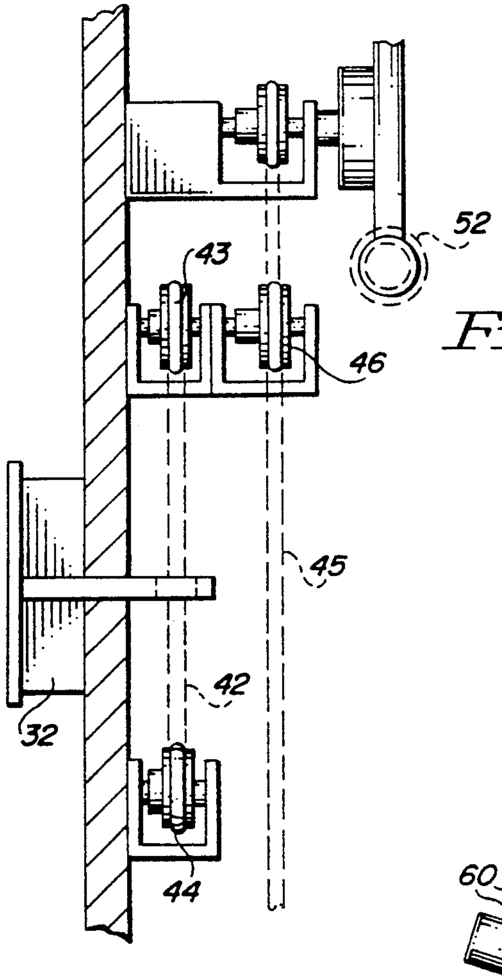
FIG. 6A is an enlarged side view, partly in section, of a portion of FIG. 6 taken along line 6A—6A.

Referring now to FIGS. 6 and 6A, a front elevational view of an appropriate apparatus for simultaneously adjusting the focus or defocus of all laser beams is shown. The individual optical systems 32 are shown mounted on a backing plate 40 and may be positioned individually along their respective axis 41 extending radially of the wire to be marked. Each of the optical systems 32 are positionable along their respective axis through operation of an endless belt 42 to which the optical system is attached. The belt extends over pulleys 43 and 44. A master belt 45 engages a corresponding pulley 46 associated with each of the optical systems. The master belt 45 also engages a drive pulley 50 that is driven through the rotation of a worm gear 52. As the worm gear 52 is rotated, it drives the master belt 45 which in turn drives the corresponding pulleys 46 and pulleys 43. The driving of pulleys 43 causes the endless belt 42 (and the optical system 32 to which it is attached) to move radially with respect to the wire being marked. Thus, by appropriately driving the worm gear 52, all of the optical systems are moved radially with respect to the wire being marked to appropriately shape or focus the corresponding laser beam.

Figure 8:
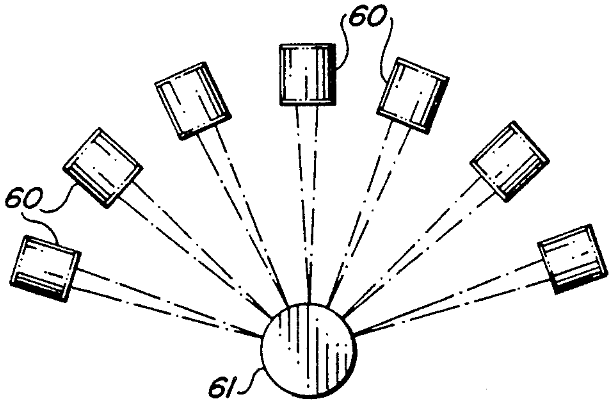
FIG. 8 is a front elevational view of the embodiment of FIG. 7.
Figure 7:
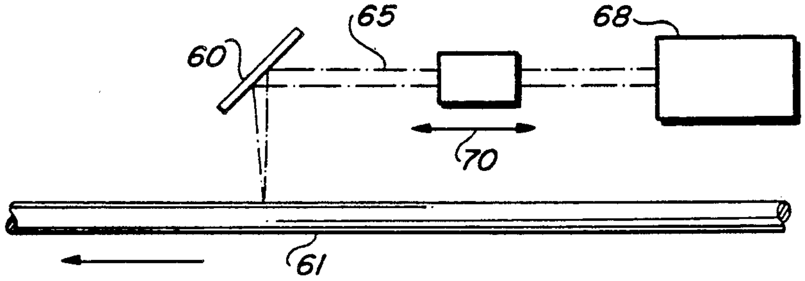
FIG. 7 is a side view of an alternative embodiment of the apparatus of the present invention.

In the above embodiment chosen for illustration, each of the respective lasers and corresponding optical systems were positioned circumferentially about the surface of a wire being marked. The simultaneous positioning of the respective optical systems requires that they each be moved radially with respect to the wire; further, since each optical system is on a different radial extending from the wire, the optical systems will move convergently or divergently. The mechanism utilized may thus tend to become complicated and may present operational difficulties. A simpler apparatus for focusing the respective laser beams on the surface of the wire to be marked is shown in FIGS. 7 and 8. Referring to those figures, each of the laser and optical system combinations shown FIGS. 4 and 6 have been replaced by mirrors 60. Thus, the mirrors 60 are positioned circumferentially of the wire 61 being marked. FIG. 8 is a front elevational view of the alternative embodiment and illustrates the circumferential array of the respective mirrors 60. FIG. 7 is a side view of one of the mirrors of FIG. 8 showing the mirror 60 in fixed position with respect to the wire 61 and arranged to direct the laser beam 65 onto the surface of the wire. The laser beam originates with laser 68 and is shaped or focused by the optical system 69.

To accommodate variations in the diameter of the wire 61, the optical system 69 may be moved axially of the beam 65 as shown by the arrows 70. Thus, for each of the mirrors 60 of FIG. 8, there will be a corresponding laser beam source 68 and optical system 69. Since each of the optical systems 69 corresponding to the mirrors 60 of FIG. 8 will be moved in parallel paths with respect to each other, they may all be mounted on a common support plate (not shown) which may be adjusted in the direction indicated by the arrow 70 in FIG. 7 to simultaneously focus or defocus or shape all of the laser beams. In this fashion, a simplified mechanical arrangement may be used to simultaneously focus all of the laser beams to accommodate variations in the diameter of the wire being marked.

In the embodiment of FIGS. 7 and 8, the point of impact of the laser beam on the surface of the wire may vary along the length of the wire as the respective laser beams are focused; however, this slight variation will not normally adversely affect the implementation of the alternative embodiment.

While the present invention has been disclosed with reference to a specific embodiment and alternatives, it is to be understood that the present invention is not limited to such embodiments but includes modified forms within the scope of the appended claims. For example, while the present invention has been described in terms of $Co_2$ lasers, other forms of lasers are of equal applicability. Each type of laser has its own benefits and corresponding disadvantages. For example, Yag lasers, although not capable of pulse width variations, may nevertheless be utilized. Similarly, pulsed $Co_2$ atmospheric pressure lasers or ultraviolet lasers may be advantageous in the system of the present invention.

It is to be understood that the present invention is not limited to the particular construction and arrangement of parts disclosed and illustrated herein but embraces all such modified forms thereof which are within the scope of the following claims.

What is claimed is:

1. A method for marking coated wire with alphanumeric characters, comprising the steps of:
   (a) providing an electrically conductive wire having a coating responsive to impringement of a laser beam for leaving a mark where the laser beam strikes the coating;
   (b) arranging a plurality of lasers circumferentially of the wire;
   (c) moving said wire at a selected speed past said lasers;
   (d) monitoring and encoding said speed; and
   (e) triggering said lasers in synchronization with said encoded speed to cause the impingement of the respective resulting laser beams on the coating of said wire to form a dot matrix alphanumeric character on said wire.

2. The method of claim 1 including the step of shaping each laser beasm before it impinges on said coating.

3. The method of claim 2 wherein the step of beam shaping is accomplished by positioning a plurality of optical systems, each corresponding to a different one of said lasers, in a beam path and moving each optical system radially of said wire.

4. The method of claim 2 wherein the step of beam shaping is accomplished by positioning a plurality of optical systems, each corresponding to a different one of said lasers, in a beam path and moving each optical system along a path parallel to the axis of said wire.

5. The method of claim 2, wherein said step of shaping each laser beam further comprises the steps of determining a size of the coated wire and refocusing each of said laser beams to focus only on said coating responsive to the impingement of a laser beam.

6. The method of marking coated wire with alphanumeric characters, comprising the steps of:

(a) providing an electrically conducting wire having insulation thereon, a first coating on said insulation and top coating on said first coating, said first and top coating having contrasting colors;
(b) arranging a plurality of lasers circumferentially of the wire;
(c) moving said wire at a selected speed past said lasers;
(d) monitoring and encoding said speed; and
(e) triggering said lasers in synchronization with said encoded speed to cause impingement of the respective laser beams on the top coating of said wire to ablate said top coating and expose said first coating to form a dot matrix alphanumeric character on said wire.

7. The method of claim 6 including the step of shaping each laser beam before it impinges on said top coating.

8. The method of claim 7 wherein the step of beam shaping is accomplished by positioning a plurality of optical systems, each corresponding to a different one of said lasers, in a beam path and moving each optical system radially of said wire.

9. The method of claim 7 wherein the step of beam shaping is accomplished by positioning a plurality of optical systems, each corresponding to a different one of said lasers, in a beam path and moving each optical system along a path parallel to the axis of said wire.

10. The method of claim 7, wherein said step of shaping each laser beam further comprises the steps of determining a size of the coated wire and refocusing each of said laser beams to focus only on said top coating responsive to impingement of a laser beam.

11. Apparatus for marking coated wire with alphanumeric characters, comprising:

(a) an electrically conductive wire having a coating responsive to the impingement of a laser beam for leaving a mark where the laser beam strikes the coating;
(b) a plurality of lasers circumferentially disposed around said wire, each laser generating a beam of coherent energy of sufficient intensity to mark said coating;
(c) a plurality of optical systems each associated with a different one of said lasers for shaping a respective one of said beams;
(d) means for moving said wire at a selected speed past said lasers;
(e) means for monitoring and encoding said speed; and
(f) means for triggering said lasers in synchronization with said encoded speed to cause impingement of the laser beams on the coating of said wire to form a dot matrix alphanumeric character on said wire.

12. The apparatus of claim 11 wherein each of said lasers is positioned to direct a beam radially of said wire.

13. The apparatus of claim 11 wherein each of said lasers is positioned to direct a beam parallel to a longitudinal axis of said wire and including a plurality of mirrors each corresponding to a different one of said lasers and each positioned to redirect a beam from a corresponding one of said lasers radially of said wire onto the coating on said wire.

14. The apparatus of claim 11 including means connected to all of said optical systems for simultaneously moving said optical systems to simultaneously shape all beams.

15. The apparatus of claim 11, further comprising means for inputing a size of the coated wire and means for refocusing each of said plurality of laser beams in response to said means for inputing a size of said coated wire such that each of said laser beams are focused only on said coating responsive to impingement of a laser beam.

* * * * *

UNITED STATES PATENT AND TRADEMARK OFFICE
CERTIFICATE OF CORRECTION

PATENT NO. : 5,130,721

DATED : July 14, 1992

INVENTOR(S) : Yefim P. Sukhman

It is certified that error appears in the above—identified patent and that said Letters Patent is hereby corrected as shown below:

Column 6,

In claim 1, line 4, delete "impringement" and insert --impingement--.

Column 7,

In claim 2, line 2, delete "beasm" and insert --beam--.

Column 7,

In claim 6, line 6, change "coating" to --coatings--.

Column 8,

In claim 11, line 4, after the word "to" delete "the".

Signed and Sealed this

Fourteenth Day of September, 1993

Attest:

BRUCE LEHMAN

*Attesting Officer*

*Commissioner of Patents and Trademarks*